Jan. 12, 1926.
A. P. LOFSTRAND
1,569,230
AUTOMATIC GRAIN SHOCKER
Filed Feb. 9, 1924.
4 Sheets-Sheet 1
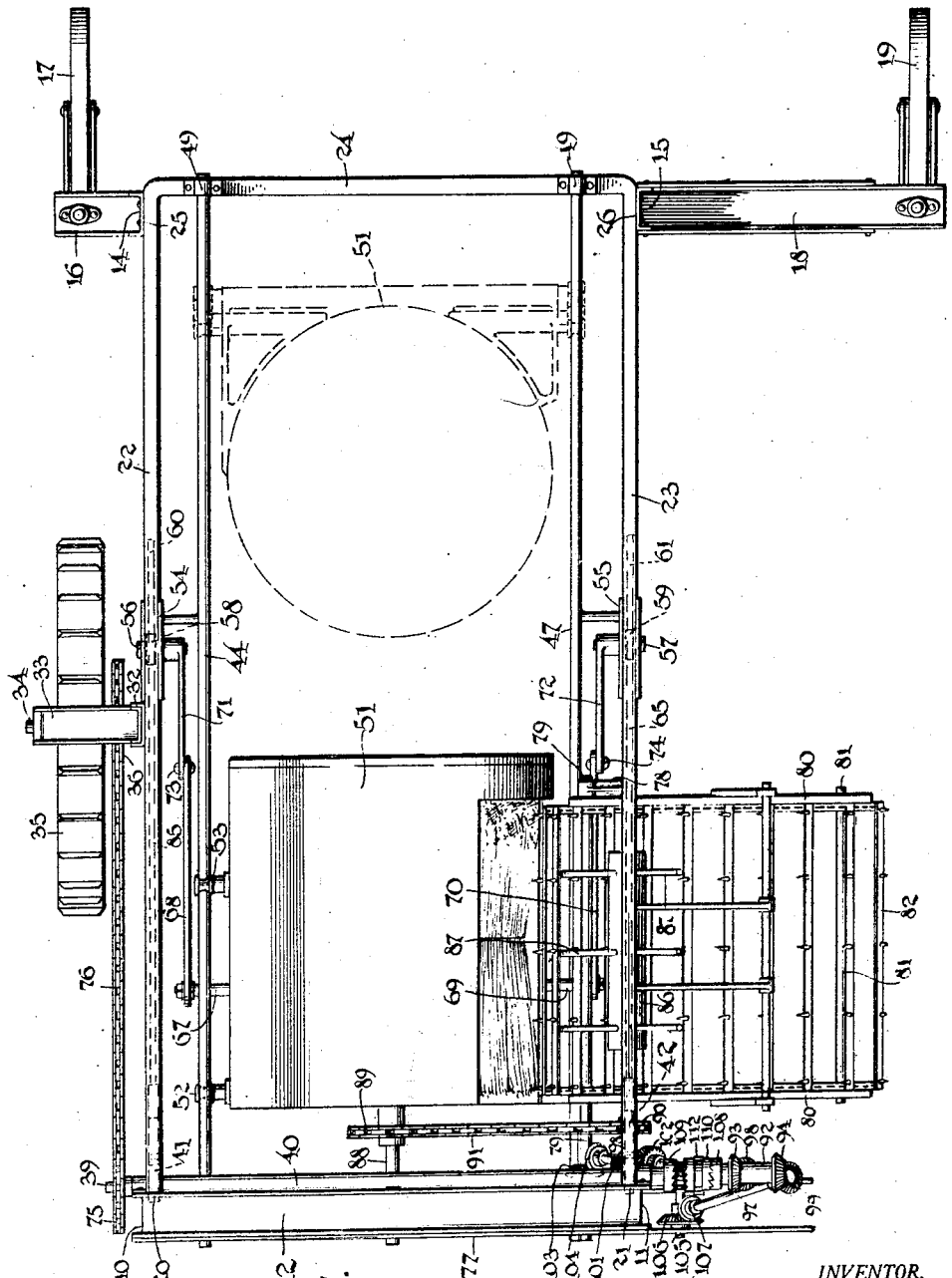
INVENTOR.
A. P. Lofstrand,
BY
Geo. P. Kimmel
ATTORNEY.

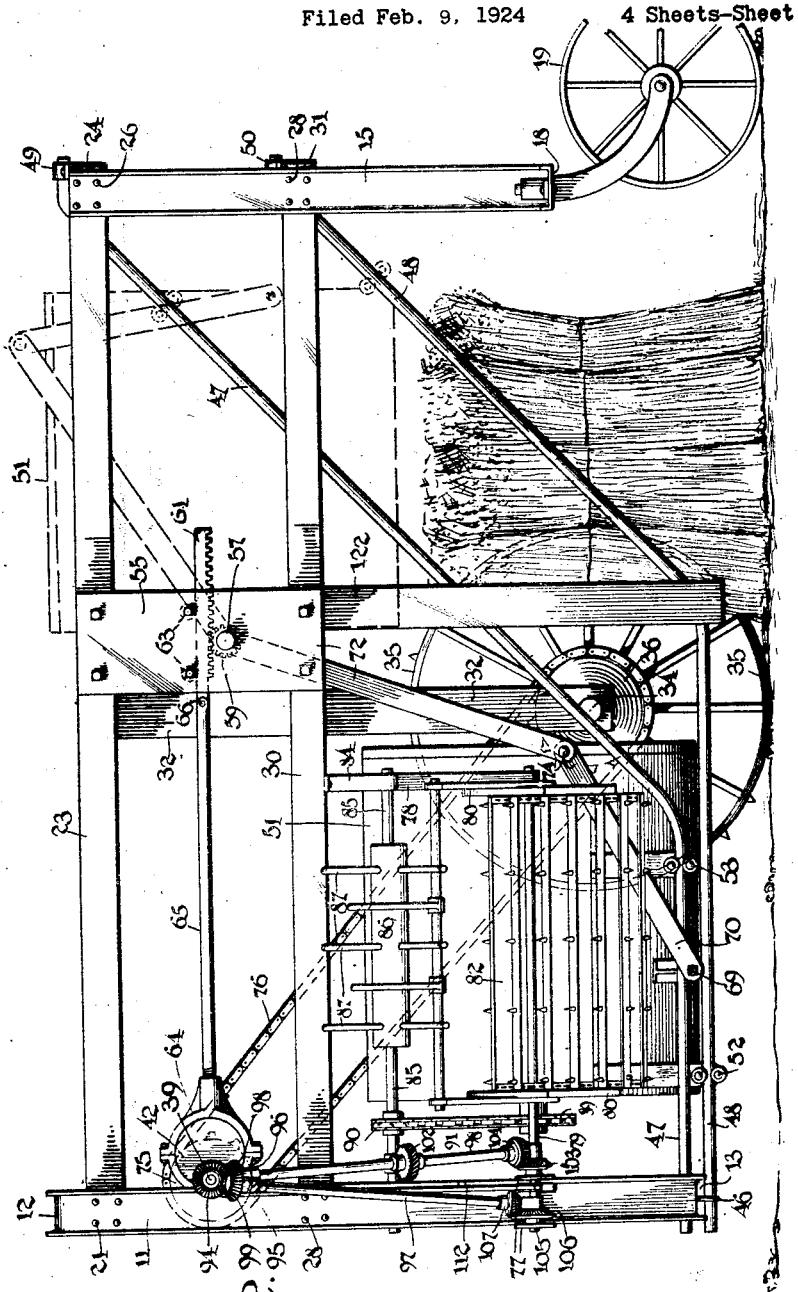

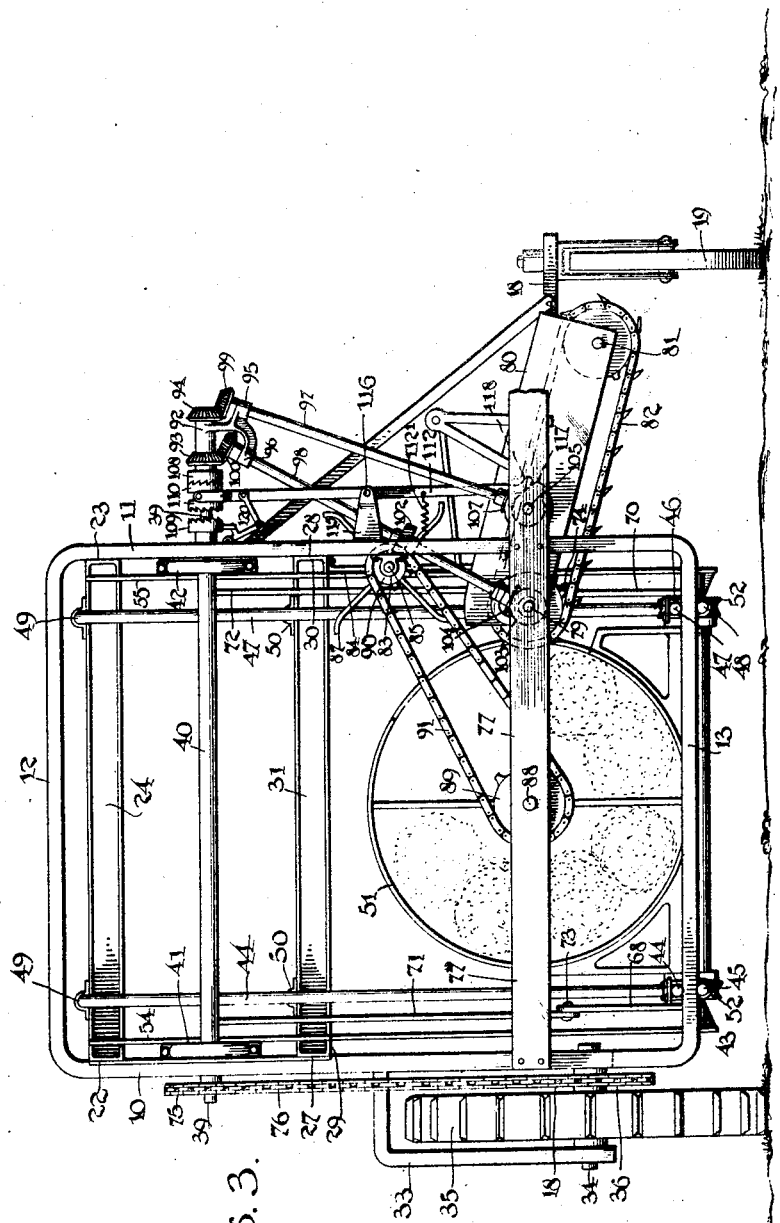

Jan. 12, 1926.
A. P. LOFSTRAND
AUTOMATIC GRAIN SHOCKER
Filed Feb. 9, 1924　　4 Sheets-Sheet 4
1,569,230
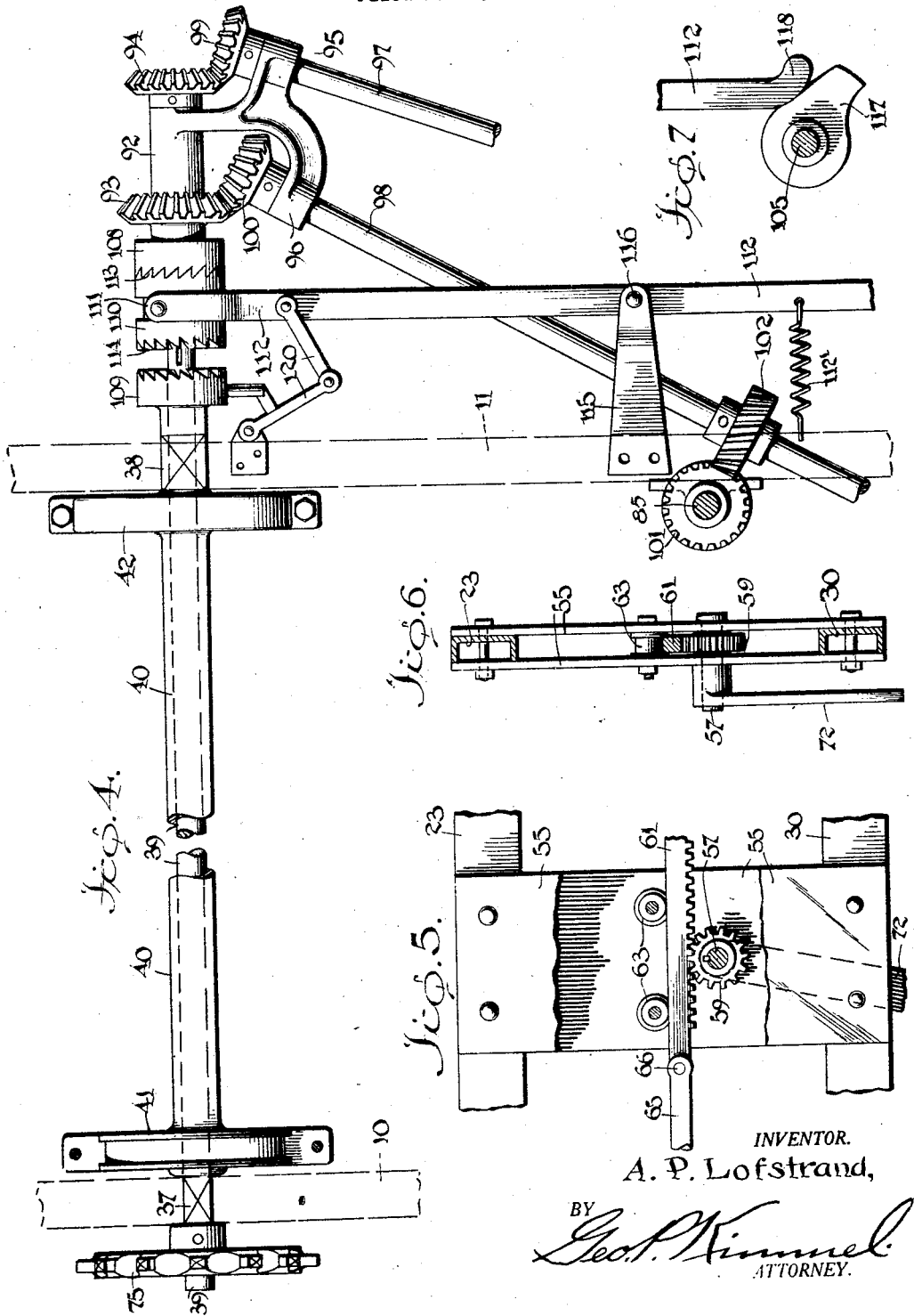
INVENTOR.
A. P. Lofstrand,
BY
Geo. F. Kimmel.
ATTORNEY.

Patented Jan. 12, 1926.

1,569,230

UNITED STATES PATENT OFFICE.

ALBIN P. LOFSTRAND, OF CHICAGO, ILLINOIS.

AUTOMATIC GRAIN SHOCKER.

Application filed February 9, 1924. Serial No. 691,668.

*To all whom it may concern:*

Be it known that I, ALBIN P. LOFSTRAND, a citizen of the United States, residing at Chicago, in the county of Cook and State of Illinois, have invented certain new and useful Improvements in Automatic Grain Shockers, of which the following is a specification.

This invention relates to grain shockers, and has for one of its objects to simplify and improve the construction and increase the efficiency and utility of devices of this character.

With these and other objects in view the invention consists in certain novel features of construction as hereinafter shown and described and then specifically pointed out in the claims, and in the drawings illustrative of the preferred embodiment of the invention—

Figure 1 is a plan view,

Figure 2 is a side elevation, and

Figure 3 is a front elevation of the improved apparatus.

Figure 4 is an enlarged detail of parts of the operating mechanism.

Figure 5 is an enlarged detail of a portion of the cage shifting mechanism, partly in section.

Figure 6 is a side elevation of the parts shown in Figure 5, partly in section.

Figure 7 is a detail of the shifting cam.

The improved apparatus includes a supporting frame formed with a forward portion comprising vertical side members 10—11, upper transverse member 12 and lower transverse member 13; and a rear portion comprising vertical members 14—15.

The rear frame member 14 is offset at the lower end as at 16 and carries a caster wheel 17, while the rear frame member 15 is likewise offset at the lower end, as at 18, and carries a caster wheel 19.

Attached at 20 and 21 to the vertical frame members 10 and 11 is a U shaped horizontal upper frame including spaced side portions 22 and 23 and a transverse portion 24, the latter being attached at 25 and 26 to the vertical members 14 and 15.

Attached at 27 and 28 to the frame members 10 and 11 is another U-shaped frame member including side portion 29 and 30 and a transverse portion 31. The U-shaped frame portion 29—30—31 is in vertical alinement with and spaced below the U-shaped frame portion 22—23 and 24.

Rigidly attached to the frame members 22 and 29 is a vertical support 32, and attached to the member 32 is a supporting bracket 33 with a stub axle 34 mounted for rotation in the lower end of the bracket and the vertical member 32. A traction wheel 35 is mounted to rotate with the axle 34, and a chain wheel 36 is likewise attached to the axle, and rotative therewith.

The supporting frame as a whole is thus supported by the traction wheel 35 and caster wheels 17 and 19.

Supported by suitable bearings, indicated at 37 and 38, upon the frame members 10 and 11, is a main shaft 39, and enclosing the shaft between the bearings is a relatively long sleeve or tubular shaft 40 having cams 41 and 42 at the ends.

Connected to the transverse portion 13 of the framework near the vertical portion 10, as by a U-bolt 43, are guide rods 44 and 45, and likewise connected to the same frame portion 13, as by a U-bolt 46, are guide rods 47 and 48. The rods 44 and 45 extend for a distance in parallel relation horizontally, and are then directed upwardly and rearwardly obliquely to the line of travel of the machine, and likewise in parallel relation but spaced at a greater distance than the horizontal portions. At their rear ends the guide rods are coupled as indicated at 49 and 50 to the transverse frame portions 24 and 31.

The guide rods provide means for the movement of the receptacle for the bundles of bound grain which are to form the shock, the receptacle being represented as a whole at 51 and provided with spaced guide rollers 52 and 53 engaging the rods, as shown.

The interior construction of the receptacle is the same as shown in my prior Patent 1,515,396, November 11, 1924, and it is not necessary to further describe the same.

Attached to the opposite sides of the frame members 22 and 27 is a support formed of plates 54, and likewise attached to the opposite sides of the frame members 23 and 30 is a like support 55.

Supported through the supporting members 54 is a rock shaft 56, and likewise supported through the members 55 is a like rock shaft 57.

Mounted on the rock shaft 56 between the frame members 54 is a gear pinion 58, while a like gear pinion 59 is mounted on the rock shaft 57 between the frame members 55. A gear rack indicated at 60, operates between the frame members 54 and engages the gear pinion 58, while a like gear rack 61 operates between the frame members 55, and engages the gear pinion 59. The racks 60 and 61 are held in operative engagement respectively with the gear pinions by suitable guide rollers, one pair of which is represented at 63.

Each of the cams 41 and 42 is provided with a strap of the usual construction, one of which is represented at 64, and connected to each strap is an operating rod, one of which is indicated at 65, each rod being pivoted as at 66 to one of the gear racks. By this arrangement it will be obvious that when the tubular shaft 40 is rotated, the rock shafts 56 and 57 will be simultaneously rotated, the object to be hereafter explained.

Pivoted at 67 to the cage or receptacle 51 at one side is an arm 68, and likewise pivoted at 69 to the cage 51 at the opposite side is an arm 70. Rigidly attached at one end to the rock shaft 56 is an arm 71, and rigidly attached at one end to the rock shaft 57 is a like arm 72. The confronting ends of the arms 68 and 71 are pivotally united at 73, while the confronting ends of the arms 70 and 72 are pivotally united at 74.

The shaft 39 is provided with a chain wheel 75 in alinement with the chain wheel 36 on the axle 34 with a drive chain 76 operating over the wheels, to cause the shaft 39 to be constantly rotated by the forward movement of the traction wheel 35.

Rigidly attached transversely of the frame portions 10 and 11 are supports 77, and depending from the frame member 30 is a hanger 78. A shaft 79 is journalled at the ends in the members 77 and the hanger 78.

Supported upon the shaft 79 are spaced side plates 80, and journalled through the members 80, at their lower and outer ends, is a shaft 81. The shafts 79 and 81 support an endless slatted and toothed carrier belt represented as a whole at 82, and is disposed in position to receive the bound bundles from a harvester and binder, not shown.

Mounted for rotation in a bracket 83 attached to the frame member 11 and in a hanger 84 depending from the frame member 30, is a longitudinally directed shaft 85, and connected to the latter is a drum 86 carrying a plurality of radiating picker fingers 87. A stub shaft 88 is mounted for rotation in the supports 77 and carries a chain wheel 89 in alinement with a chain wheel 90 on the shaft 85, the chain wheels to receive an endless chain 91, as shown.

Mounted on the shaft 39 is a hanger 92, and likewise mounted on the same shaft are bevel pinions 93 and 94. The hanger 92 is formed with two bearings 95 and 96 in which the upper ends of obliquely disposed shafts 97 and 98 are journalled at the upper ends, the obliquely directed shafts carrying bevel pinions 99 and 100 respectively engaging the bevel gears 94 and 93, as shown.

Mounted on the shaft 85 is a skew gear 101, and mounted on the shaft 98 is a skew pinion 102 engaging the skew gear.

Mounted on the shaft 79 is a bevel pinion 103, and mounted on the shaft 98 is a bevel pinion 104 engaging the pinion 103.

Mounted for rotation in the members 77 is another stub shaft 105 carrying a bevel pinion 106 in engagement with a like bevel pinion 107 on the obliquely directed shaft 97.

Attached to the hub of the pinion 93 is a clutch element 108, and attached to the shaft 39 is another clutch element 109. Slidable on the shaft 39 between the clutch elements 108 and 109, is a sleeve 110 having an annular channel 111 to receive the forked end of a shipper lever 112. The sleeve 110 is formed with clutch teeth 113 and 114 adapted to be alternately engaged with the teeth of the clutch elements 108 and 109 as the shipper lever is actuated. Extending from the frame member 11 is a bracket 115 to which the shipper lever 112 is pivoted at 116.

Attached to the stub shaft 105 is a cam device 117 adapted to engage the lower end of the lever member 112, the latter being outwardly curved as at 118, to facilitate the action.

With an apparatus thus constructed the operation is as follows:

The harvester and binder is attached to the supporting frame in any suitable manner and travels therewith and in position to convey the bound bundles to the apron or conveyor belt 82, the harvester and binder not being shown as it forms no part of the present invention.

As the machine moves forwardly the tractor wheel 35 imparts constant motion to the shaft 39 by the chain 76 and also imparts constant motion to the pinions 94, 99, shaft 97, pinions 106, 107, and cam 117. During the time that the concentric portion of the cam 117 is in engagement with the lever 112—118, the spring 112' will hold the clutch 110 in engagement with the clutch element 108 and cause the operation of the feed belt 82, pickers 87 and the mechanism within the receiver 51 not shown. During the time the lever 112 is thus held the fingers 120 engage the clutch element 109 and prevent the tubular shaft 40 and eccentrics 41 and 42 from action, to prevent premature movement of the receptacle 51.

During the operation of the shaft 98 and its associated parts the mechanism within the receptacle 51 which as before stated, is no part of the present invention, is slowly rotated to receive the bound bundles from the feed belt and pickers.

The gearing will be so proportioned that when the eccentric portion of the cam 117 engages the lever 112—118, the number of bundles required to form a shock will have been deposited in the receptacle 51, and thereafter the cam 117 will trip the lever and transfer the clutch element 110 to the clutch element 109 and release the clutch element 110 from the clutch element 108 and stop the motion of the belt 82, pickers 87 and the gears 89 and 90 and chain 91. In the meantime the fingers 120 have been withdrawn from engagement with the clutch element 109, so that the motion of the shaft 39 will be transmitted to the member 40 and eccentrics 41 and 42 and cause the racks 60 and 61 to actuate the levers 71 and 72, links 68 and 70 to move the receptacle 51 along the tracks 47 and 48 and dispose it in discharging position as indicated by broken lines in Figure 2, and then return the receptacle to receiving position. The parts will be so proportioned that the receptacle 51 will be moved into discharging position and returned to receiving position during one complete revolution of the eccentrics 41 and 42, and the feed belt 82, pickers 87, and stub shaft 88, held stationary during the rearward and return movements of the receptacle.

Additional supporting struts 122 will be attached to the frame members 23 and 30, to apply additional support to the lower guide rail members.

Having thus described the invention, what is claimed as new is:—

1. In a grain shocker, a supporting frame mounted on carrier wheels one of which is a traction wheel, guide tracks in spaced relation mounted on said frame and each including a horizontal portion and an inclined portion, a receptacle for the bundles of grain and having guide pulleys engaging said tracks, rock shafts mounted on said supporting frame, arms carried by said rock shafts, links connecting said arms to said bundle receptacle, and means for intermittently transmitting the motion of said traction wheel to said rock shafts to cause said receptacles to be moved upon said tracks into discharging position and returned to receiving position.

2. In a grain shocker, a supporting frame mounted on carrier wheels one of which is a traction wheel, guide tracks in spaced relation mounted on said frame and each including a horizontal portion and an inclined portion, a receptacle for the bundles of grain and having guide pulleys engaging said tracks, rock shafts mounted on said supporting frame, arms carried by said rock shafts, links connecting said arms to said bundle receptacle, gear pinions mounted on said rock shafts, gear racks engaging said pinions, a counter shaft supported on said frame, cam devices operatively coupled to said gear racks, means for transmitting the motion of said traction wheel to said counter shaft, and means for intermittently transmitting the motion of said counter shaft to said cam devices, to cause said receptacles to be moved upon said tracks into discharging position and returned to receiving position.

3. In a grain shocker, a supporting frame mounted on carrier wheels one of which is a traction wheel, guide tracks in spaced relation mounted on said frame and each including a horizontal portion and an inclined portion, a receptacle for the bundles of grain and having guide pulleys engaging said tracks, rock shafts mounted on said supporting frame, arms carried by said rock shafts, links connecting said arms to said bundle receptacle, gear pinions mounted on said rock shafts, gear racks engaging said pinions, a counter shaft supported on said frame, a tubular shaft rotative on said counter shaft, cam devices carried by said tubular shaft and connected respectively to said gear racks, means for transmitting the motion of said traction wheel to said counter shaft and means for intermittently transmitting the motion of said counter shaft to said tubular shaft and the cam devices carried thereby, to cause said receptacle to be moved upon said tracks into discharging position and returned to receiving position.

4. In a grain shocker, a supporting frame mounted on carrier wheels one of which is a traction wheel, guide tracks in spaced relation mounted on said frame and each including a horizontal portion and an inclined portion, a receptacle for the bundles of grain and having guide pulleys engaging said tracks, means for feeding bundles of grain to said receptacle, rock shafts mounted on said supporting frame, coupling means between said rock shafts and said bundle receptacle and means for intermittently transmitting the motion of said traction wheels to said rock shafts to cause said receptacle to be moved upon said tracks into discharging position and returned to receiving position.

5. In a grain shocker, a supporting frame, guide tracks in spaced relation mounted on said frame and each including a horizontal portion and an inclined portion, a receptacle for the bundles of grain having guide pulleys engaging said tracks, rock shafts mounted on said supporting frame, arms carried by said rock shafts, links connecting said arms to said bundle receptacle, means for intermittently transmitting motion to said rock shafts to cause said receptacles to be moved upon said tracks into discharging position and returned to receiving position.

6. In a grain shocker, a supporting frame, guide tracks in spaced relation mounted on said frame and each including a horizontal portion and an inclined portion, a receptacle for the bundles of grain having guide pulleys engaging said tracks, rock shafts mounted on said supporting frame, coupling means between said rock shafts and said bundle receptacle, and means for intermittently transmitting motion to said rock shafts to cause said receptacles to be moved upon said tracks into discharging position and returned to receiving position.

7. In a grain shocker, a supporting frame, guide tracks in spaced relation mounted on said frame and each including a horizontal portion and an inclined portion, a receptacle for the bundles of grain having guide pulleys engaging said tracks, rock shafts mounted on said supporting frame, gear pinions mounted on said rock shafts, gear racks engaging said pinions, a counter shaft supported on said frame, cam devices operatively coupled to said gear racks, means for transmitting motion to said counter shafts, and means for intermittently transmitting the motion of said counter shaft to said cam devices, to cause said receptacle to be moved upon said tracks into discharging position and returned to receiving position.

8. In a grain shocker, a supporting frame, guide tracks in spaced relation mounted on said frame and each including a horizontal portion and an inclined portion, a receptacle for the bundles of grain having guide pulleys engaging said tracks, means for feeding bundles of grain to said receptacle, rock shafts mounted on said supporting frame, coupling means between said rock shafts and said bundle receptacle, a counter shaft supported on said frame, a tubular shaft rotative on said counter shaft and carrying a clutch element, means for transmitting the motion of said tubular shaft to said rock shafts, a member including a clutch element rotative on said counter shaft, means for transmitting the motion of said rotative member to said bundle feeding means, a sleeve slidable on said counter shaft and rotative therewith and carrying clutch elements adapted to alternately engage the clutch elements of the tubular shaft and of the rotative member, a shipper device connected to operate said sleeve, a cam device arranged to engage said shipper device, and means for transmitting the motion of said counter shaft to said cam device, to intermittently actuate the tubular shaft and the bundle receptacle associated therewith, and the bundle feeding means.

9. In a grain shocker, a supporting frame, guide tracks in spaced relation mounted on said frame and each including a horizontal portion and an inclined portion, a receptacle for the bundles of grain having guide pulleys engaging said tracks, means for feeding bundles of grain to said receptacle, rock shafts mounted on said supporting frame, coupling means between said rock shafts and said bundle receptacle, a counter shaft supported on said frame, a tubular shaft rotative on said counter shaft and carrying a clutch element, means for transmitting the motion of said tubular shaft to said rock shafts, a member including a clutch element rotative on said counter shaft, means for transmitting the motion of said rotative member to said bundle feeding means, a sleeve slidable on said counter shaft and rotative therewith and carrying clutch elements adapted to alternately engage the clutch elements of the tubular shaft and of the rotative member, a shipper device connected to operate said sleeve, means carried by said shipper device for holding the tubular shaft from rotation during the time that the clutch element connected therewith is out of action, a cam device arranged to engage said shipper device, and means for transmitting the motion of said counter shaft to said cam device, to intermittently actuate the tubular shaft and the bundle receptacle and the bundle feeding means associated therewith.

In testimony whereof, I affix my signature hereto.

ALBIN P. LOFSTRAND.